United States Patent Office 3,329,608
Patented July 4, 1967

3,329,608
AQUEOUS PREPARATIONS OF SALTS OF N,N-DI-SUBSTITUTED ACID AMIDES OF DI- OR TRI-CARBOXYLIC ACIDS
Armin Hiestand, Binningen, Switzerland, assignor to Ciba Limited, Basel, Switzerland, a Swiss company
No Drawing. Filed Apr. 6, 1964, Ser. No. 357,733
Claims priority, application Switzerland, Apr. 23, 1963, 5,058/63
2 Claims. (Cl. 252—8.8)

Aqueous solutions, dispersions and pastes of alkali metal salts of N,N-disubstituted acid amides derived from dicarboxylic acids, such as adipic or sebacic acid, are known. The products are semi-amides, in which one carboxyl group takes the form of a salt and the other contains the amide grouping formed by reaction with a secondary amine. It has also been proposed to use aqueous preparations of these semi-amides as textile assistants, for example as softeners (c.f. U.S. Specification 2,936,251 granted May 10, 1960 to Bertram J. Garceau et al.) The use of these aqueous preparations entails considerable difficulties because the solutions and dispersions, especially when manufactured with hard water, are unstable and form precipitates after a short time. It has now been found that stable solutions and dispersions are obtained even with hard water when selected assistants are added, and that with the use of these preparations the desired improving effects can be obtained on textile materials. It has now been found that cationic and anionic assistants are unsuitable and that from the large range of nonionic assistants only adducts of ethylene oxide with alkalphenol can be successfully used. When ethylene adducts from higher aliphatic or cycloaliphatic alcohols, from higher fatty acids or higher fatty amines are used, there are in fact obtained stable solutions or dispersions of the salts of the semiamides but the desired improving effect, especially in the manufacture of softened textile fibers, does not materialise.

The present invention provides aqueous preparations in the form of solutions, dispersions or pastes of salts of N,N-disubstituted acid amides of dicarboxylic or tricarboxylic acids, containing in addition per mol of the acid amide salt 0.02 to 0.4 mol of a condensation product from 5 to 80 mols of ethylene oxide with 1 mol of an alkylphenol. The semi-amides correspond preferably to the general formula

 [A—COOM]

where A represents an aliphatic, cycloaliphatic or aromatic divalent or trivalent hydrocarbon radical containing at most 8, preferably 2 to 6, carbon atoms; M represents an alkali metal atom; R and R' each represents an identical or different radical of the formula R"—, R"—CONH—R'"— or R"—CONH—R'"—N—R"—

where R" represents an aliphatic hydrocarbon radical containing 11 to 23 carbon atoms, and R'" represents a divalent radical containing 2 to 3 carbon atoms, and $n=1$ or 2. The hydrocarbon radical A, to which the amide grouping and the carboxyl group or its salt are bound, is derived from a dicarboxylic or tricarboxylic acid.

As dicarboxylic and tricarboxylic acids used for the manufacture of the semi-amides there are suitable aliphatic, aromatic and cycloaliphatic acids, for example, oxalic, succinic, malonic, adipic, sebacic, maleic, phthalic, tetrahydrophthalic, hexahydrophthalic, terephthalic and trimellitic acid and the corresponding anhydrides. The semiamides are obtained by condensing 1 mol of a dicarboxylic acid, or of a dicarboxylic acid anhydride, with 1 mol of a secondary amine, for example with 1 mol of a dialkylamine of the formula R"—NH—RR", or of a monoamideomonoalkylamine of the formula

R"—NH—R'"—NHCO—R"

or of a diamido-monalkylamino of the formula

R"—CONH—R'"—NH—R'"—NHCO—R'"

or of a triamido-monoalkylamine of the formula

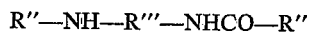
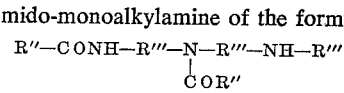

where R" is an aliphatic hydrocarbon radical containing 11 to 23 carbon atoms and R'" represents a divalent radical with 2 to 3 carbon atoms. R" is, for example, $C_{11}H_{23}$, $C_{12}H_{25}$, $C_{15}H_{31}$, $C_{17}H_{33}$, $C_{17}H_{35}$ or $C_{21}H_{43}$ and R'" is —CH$_2$CH$_2$—, —CH$_2$CH$_2$CH$_2$—, $$-CH_2-CH- \text{ or } -CH_2-CH-CH_2-$$
$$\quad\quad |\quad\quad\quad\quad\quad\quad |$$
$$\quad CH_3 \quad\quad\quad\quad\quad OH$$

In this case of trimellitic acid or of its anhydride 2 mols of secondary amine are used.

A preferred dicarboxylic acid is phthalic acid or its anhydride. Especially suitable secondary amines are N,N-dialkylmonoamines whose alkyl radicals contain 12 to 22 carbon atoms, and condensation products of 2 mols of a higher fatty acid with 1 mol of diethylenetriamine or dipropylenetriamine. The sodium and potassium salts are the preferred salts of the semi-amides; advantageously, they are prepared by treating the semi-amides with alcoholic sodium or potassium hydroxide solution.

The phenols suitable for the manufacture of the hydroxyethylated alkylphenols corresponds preferably to the general formula

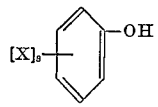

where X represents a straight or branched alkyl or cycloalkyl radical containing 1 to 12 carbon atoms and $s=1, 2$ or 3. Advantageously, at least one radical X contains 4 to 12 carbon atoms. As relevant examples there may be mentioned: Tertiary octylphenol, di-tertiary butyl-para-cresol, para-tertiary-butyl-ortho-cresol, nonylphenol, dodecyphenol and para-cyclohexylphenol.

The nonionic assistant to be used according to the invention is obtained by adding 5 to 80, preferably 8 to 30, mols of ethylene oxide on to 1 mol of alkylphenol.

The amount of ethylene oxide adduct, referred to the salt of the semi-amide, cannot be selected at will. To ensure that, on the one hand, a stable aqueous preparation is formed and, on the other hand, material treated with such a preparation is improved in the desired manner, there must be used 0.02 to 0.4 mol, preferably 0.1 to 0.2 mol of the ethylene oxide condensation product per mol of the salt of the semi-amide. The term "aqueous preparation" covers not only solutions and dispersions but also pastes. The pastes contain 30 to 70 percent by weight of the mixture of semi-amide and nonionic assistant. The solutions and dispersions contain as a rule per liter 0.1 to 10 g., preferably 0.2 to 3 g., of the salt of the semi-amide as well as the nonionic assistant in an amount as stated above. The mixture of semi-amide and assistant may also form a powder from which the desired solution or dispersion is prepared before use. The dry mixture is preferably obtained by spray-drying the aqueous solutions. The pulverulent preparation is very stable and forms on addition of water the said solutions, despersions or pastes.

The combination according to the invention of an alkali metal salt of the semi-amide and the hydroxyethylated alkylphenol is distinguished primarily by the fact that it is suitable for manufacturing stable aqueous preparations even with hard water, that is to say water having a hardness of 15 to 20 German hardness degrees. These combinations produce an excellent soft handle on textile materials. The preparations made with hard water form as a rule slightly opalescent solutions or dispersions. They are primarily used as agents imparting a soft handle to textile materials in the form of woven fabric, flocks or fibers. Textile materials suitable for such improvement may be natural, regenerated, modified or fully synthetic materials, for example those from cotton, wool, viscose, cellulose-2½-acetate, triacetate, polyamides, polyesters and polyacrylonitrile. Furthermore, the preparations of the invention or aqueous forms thereof are suitable as levelling agents, as brightening agents, as after-treating agents and as antistatic dressings for textiles, and also as assistants for the paper and leather industries.

It is another advantage of the aqueous preparations that they can be used in conjunction with dyestuffs or water-soluble condensation products of urea or melamine with formaldehyde. Undyed textile materials do not turn yellow when treated with the combination of the invention. When the solutions of dispersions are caused to circulate vigorously, for example being pumped in circulation apparatus, the products are not precipitated.

The semi-amides used in the examples are prepared as follows:

*Preparation A.*—260 g. (0.5 mol.) of a secondary higher dialkylamine and 48 g. (0.25 mol.) of trimellitic anhydride are melted at 110° C. and heated at 160° C. under nitrogen until almost 5 g. (abt. 0.25 mol.) of water have been eliminated. There are obtained 302 g. (0.25 mol.) of a waxy substance which has an acid number of about 46 and gives an opalescent solution in hot 10% sodium hydroxide solution. The condensation product probably corresponds to the formula

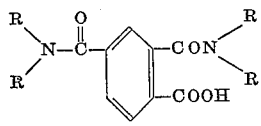

where R represents a higher alkyl radical containing 16 to 20 carbon atoms.

Instead of the above dialkylamine there may be used other secondary amines to give the following preparations Aa, Ab and Ac:

Aa: 305 g. (0.5 mol.) of a reaction product from 1 mol. of diethylenetriamine with 2 mols. of stearic acid, or Ab: 315 g. (0.5 mol.) of a reaction product with 2 mols. of oleic acid, or Ac: 202 g. 0.25 mol.) of a reaction product from 1 mol. of triethylenetetramine with 3 mols. of stearic acid which is presumed to have the formula

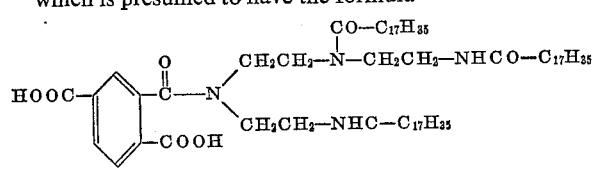

In every case a hard, waxy substance is obtained which gives an opalescent solution in hot 10% sodium hydroxide solution.

*Preparation B.*—305 g. (0.5 mol.) of a basic reaction product from 1 mol. of diethylenetriamine and 2 mols. of commercial stearic acid (molecular weight 270) are melted, and 74 g. (0.5 mol.) of powdered phthalic anhydride are added at 90 to 100° C. The mixture is slowly heated under nitrogen to about 160° C.; at 120 to 130° C. a clearly visible exothermic reaction takes place. After cooling, there are obtained 375 g. of a brittle, waxy product of beige color which melts at 58 to 60° C. This waxy substance gives an opalescent solution in 10% sodium hydroxide solution. The condensation product corresponds to the formula

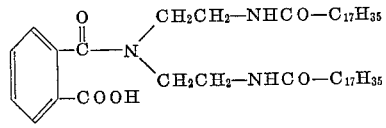

*Preparation C.*—This product is made as described for preparation B, except that the basic reaction product is replaced by 315 g. (0.5 mol.) of a product prepared in similar manner from oleic acid, or 405 g. (0.5 mol.) of a reaction product from 1 mol. of triethylenetetramine with 3 mols. of stearic acid.

*Preparation D.*—This product is prepared as described for Preparation B, except that 0.5 mol of phthalic anhydride is replaced by 76 g. (0.5 mol) of tetrahydrophthalic anhydride, to yield 380 g. of a light-colored, brittle wax which gives an opalescent solution in hot 10% sodium hydroxide solution. An identical product is obtained by using 77 g. (0.5 mol) of hexahydrophthalic acid.

*Preparation E.*—305 g. (0.5 mol) of a basic reaction product from 1 mol of diethylenetriamine and 2 mols of commercial stearic acid (molecular weight 270) are melted, and 83 g. (0.5 mol) of terephthalic acid are added at 90 to 100° C. The mixture is slowly heated under nitrogen to about 200° C. After cooling, a hard, waxy substance of light color is obtained which gives an opalescent solution in 10% sodium hydroxide solution.

*Preparation F.*—The product is prepared as described for Preparation E, except that 0.5 mol of terephthalic acid is replaced by 73 g. (0.5 mol) of adipic acid, to yield a waxy substance of light-beige color which gives an opalescent solution in hot 10% sodium hydroxide solution. A similar product is obtained by using 101 g. of sebacic acid.

*Preparation G.*—The product is prepared as described for Preparation B, except that phthalic anhydride is replaced by 59 g. (0.5 mol) of succinic anhydride. The resulting pale-yellow, hard, waxy substance obtained gives an opalescent solution in hot 10% sodium hydroxide solution.

*Preparation H.*—The product is prepared as described for Preparation B, except that there are used 260 g. (0.5 mol) of a basic condensation product from 1 mol of diethylenetriamine and 2 mols of myristic acid.

*Preparation J.*—The product is prepared as described for Preparation B, except that there are used 370 g. (0.5 mol) of a basic condensation product from 104 g. (1 mol) of diethylenetriamine and 68 g. (2 mols) of behenic acid.

*Preparation K.*—The product is prepared as described fro Preparation B, except that there are used 316 g. (0.5 mol) of a basic condensation product from 132 g. (1 mol) of di-propylenetriamine and 544 g. (2 mols) of commercial stearic acid of molecular weight 270.

*Preparation L.*—The product is prepared as described for Preparation B, except that there are used 310 g. (0.5 mol) of a basic condensation product from 370 g. (about 1 mol) of an aminopropyl-alkylamine, obtained from soybean fatty acid by a known method, and 270 g. (1 mol) of a stearic acid of molecular weight 270. The condensation product corresponds to the formula

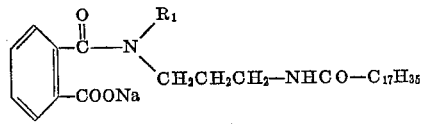

where $R_1$ represents the radical of soybean fatty acid.

EXAMPLE 1

Pastes of 50% strength are prepared from each of the waxy preparations A to L in the following manner: 1 mol of the condensation product is strongly refluxed for 2 hours in 300 g. of alcohol with 1.05 mol of sodium hydroxide (used in the form of an aqueous solution of 30% strength). The solvent is then evaporated and by heating with water a 50% solution is prepared which on cooling turns liquid to viscid.

Pastes can alternatively be prepared by boiling 1 mol of the waxy preparation with 1.05 to 1.1 mol of NaOh in sufficient water to form, when hot, a 50% solution.

EXAMPLE 2

In the following experiments the symbols have the following meanings:

= —No soft handle
+ —Trace of soft handle
++ —Distinct soft handle
+++ —Good soft handle
++++ —Very good soft handle
s —Smeary soft handle (a) *Dipping method.*—The preparation is a 50% paste of the sodium salt of preparation B and an amount, equivalent to 10 mol percent, of the adduct from 9 mols of ethylene oxide with 1 mol of nonylphenol. The water has a hardness of 20° (German hardness). The foods-to-liquor ratio is 1 : 10, and the treatment is performed at room temperature. The hanks of yarn are moved about loosely, centrifuged and then dried at 70° C.

| Preparation, g./liter | Cotton | Viscose | Nylon | Polyacrylonitrile |
|---|---|---|---|---|
| 0.5 | + | ++ | + | + |
| 1.5 | ++ | ++ | + | + |
| 2.5 | +++ | +++ | + | + |

(b) *Padding method.*—Preparation and water hardness as under (a) above. The material is passed twice through a Benteler padder. Drying is carried out at 70° C.

| Preparation, g./liter | Cotton | Viscose | Nylon | Polyacrylonitrile | Polyester | Cellulose-2½ acetate |
|---|---|---|---|---|---|---|
| F | 65 | 95 | 45 | 85 | 50 | 60 |
| 1.25 | + | ++ | ++ | + | ++ | + |
| 2.5 | + | ++++ | +++s | ++ | +++ | ++ |
| 5 | ++ | ++++ | +++s | +++ | ++++ | ++ |

F=weight increase in percent.

(c) *Exhaustion method.*—Preparation and water hardness as under (a) above. Goods-to-liquor ratio 1 : 30. The material is immersed in the bath at 45° C. and treated for 30 minutes at room temperature, then centrifuged and dried at 70° C.

| Preparation [1] | Cotton | Viscose | Triacetate | Cellulose-2½ acetate |
|---|---|---|---|---|
| 0.25 | ++ | +++ | +++ | + |
| 0.5 | +++ | ++++ | ++++ | +++ |
| 1 | +++ | ++++ | ++ | ++ |
| 2 | +++ | ++++ | + | + |

[1] Referred to the weight of the textile material.

(d) *Use in a direct dyeing bath.*—0.5 g./liter of preparation as under (a) above. Mercerised cotton yarn is dyed by the exhaustion method with addition of 15% of Glauber's salt and the direct dyestuffs shown below. The goods-to-liquor is 1:40. The treatment is carried out for 1 hour each at 90° C. with soft water and hard water.

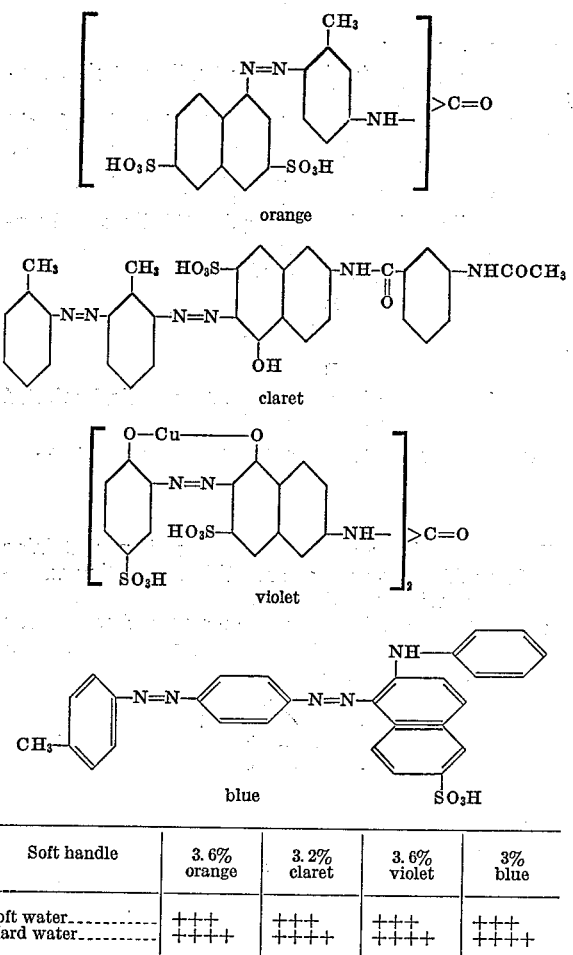

| Soft handle | 3.6% orange | 3.2% claret | 3.6% violet | 3% blue |
|---|---|---|---|---|
| Soft water | +++ | +++ | +++ | +++ |
| Hard water | ++++ | ++++ | ++++ | ++++ |

EXAMPLE 3

Viscose yarn is treated by the dipping method described in Example 2, except that the preparation used consists of a mixture of the 50% paste of the sodium salt of preparation D and an amount, corresponding to 8 mol percent, of the adduct from 30 mols of ethylene oxide with 1 mol of dodecylphenol.

The viscose hank treated in this manner has a good, soft handle.

EXAMPLE 4

Viscose, cotton, acetate rayon and triacetate rayon yarns are treated by the exhaustion method described in Example 2, except that the preparation used consists of a mixture of an amount, corresponding to 8 mol percent, of the adduct from 8 mol percent of ethylene oxide with 1 mol of tertiary octylphenol and of a paste of 50% strength of the sodium salt of preparations A, E, F, G, H, K and L respectively. The treated yarns display a soft handle which can be improved by rendering the alkaline impregnating liquor slightly alkaline with a small amount of formic acid.

What is claimed is:

1. A composition for improving textile materials consisting essentially of a mixture of (1) a salt of an N,N-disubstituted acid amide of a polycarboxylic acid selected from the class consisting of an aliphatic hydrocarbon dicarboxylic acid containing 2 to 10 carbon atoms, phthalic, terephthalic, trimellitic, tetrahydrophthalic and hexahydrophthalic acid, the N,N-disubstituted amide grouping having the formula

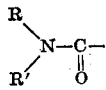

wherein R and R' each represents a radical selected from the group consisting of

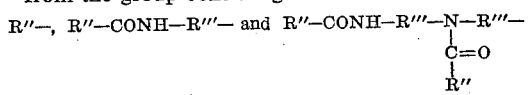

R'' representing an aliphatic hydrocarbon containing 11 to 23 carbon atoms and R''' representing an aliphatic radical containing 2 to 3 carbon atoms, and of (2) a condensation product from 5 to 80 mols of ethylene oxide with 1 mol of an alkylphenol of the general formula

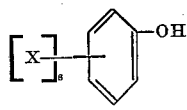

where X represents an alkyl radical containing 1 to 12 carbon atoms and $s$ is a whole number from 1 to 3, which condensation product is present in an amount of 0.02 to 0.4 mol per mol of said salt of the acid amide.

2. A composition for improving textile materials consisting essentially of a mixture of (1) a salt of a half amide of the formula

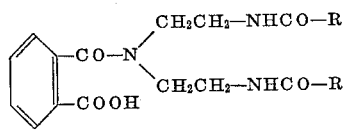

wherein R represents an aliphatic hydrocarbon containing 11 to 23 carbon atoms, and of (2) the condensation product from 8 to 10 mols of ethylene oxide with 1 mol of nonylphenol, which condensation product is present in an amount of 0.02 to 0.4 mol per mol of said salt of the half amide.

References Cited
UNITED STATES PATENTS

| | | | |
|---|---|---|---|
| 2,936,251 | 5/1960 | Garceau et al. | 117—139.5 |
| 2,953,526 | 9/1960 | Bergman et al. | 252—8.8 |
| 2,958,665 | 11/1960 | Stefcik et al. | 252—8.8 X |
| 3,131,147 | 4/1964 | Hiestand et al. | 252—8.8 |

LEON D. ROSDOL, *Primary Examiner.*

JULIUS GREENWALD, J. T. FEDIGAN,
*Assistant Examiners.*